United States Patent
Kumar et al.

(10) Patent No.: US 6,522,787 B1
(45) Date of Patent: Feb. 18, 2003

(54) METHOD AND SYSTEM FOR RENDERING AND COMBINING IMAGES TO FORM A SYNTHESIZED VIEW OF A SCENE CONTAINING IMAGE INFORMATION FROM A SECOND IMAGE

(75) Inventors: Rakesh Kumar, Dayton, NJ (US); Keith James Hanna, Princeton, NJ (US); James R. Bergen, Hopewell, NJ (US); Padmanabhan Anandan, Lawrenceville, NJ (US); Kevin Williams, Yarley, PA (US); Mike Tinker, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 1366 days.

(21) Appl. No.: 08/917,402

(22) Filed: Aug. 25, 1997

Related U.S. Application Data

(63) Continuation of application No. 08/499,934, filed on Jul. 10, 1995, now abandoned.

(51) Int. Cl.[7] .............................................. G06K 9/40
(52) U.S. Cl. ...................................... 382/268; 382/284
(58) Field of Search ............................... 382/284, 268, 382/154; 348/36, 39, 47, 50, 587

(56) References Cited

U.S. PATENT DOCUMENTS

| | | | | |
|---|---|---|---|---|
| 3,081,557 A | * | 3/1963 | Mailhot | 35/12 |
| 3,233,508 A | * | 2/1966 | Hemstreet | 88/24 |
| 3,439,105 A | * | 4/1969 | Ebeling et al. | 434/43 |
| 3,580,978 A | * | 5/1971 | Ebeling | 434/43 |
| 4,231,642 A | * | 11/1980 | Collender | 352/58 |
| 4,323,920 A | * | 4/1982 | Collender | 348/51 |
| 4,393,394 A | * | 7/1983 | McCoy | 348/587 |
| 4,515,450 A | * | 5/1985 | Arrazola | 353/5 |
| 4,758,892 A | | 7/1988 | Bloomfield | 348/585 |
| 4,797,942 A | | 1/1989 | Burt | 382/284 |
| 5,187,571 A | * | 2/1993 | Braun et al. | 348/39 |
| 5,187,754 A | * | 2/1993 | Currin et al. | 382/284 |
| 5,259,040 A | | 11/1993 | Hanna | 382/107 |
| 5,264,933 A | | 11/1993 | Rosser et al. | 348/578 |
| 5,353,392 A | | 10/1994 | Luquet et al. | 395/135 |
| 5,424,773 A | * | 6/1995 | Saito | 348/218 |
| 5,428,543 A | * | 6/1995 | Gold et al. | 701/5 |
| 5,444,478 A | * | 8/1995 | Lelong et al. | 348/39 |
| 5,455,633 A | * | 10/1995 | Gehrmann | 348/587 |
| 5,581,637 A | * | 12/1996 | Cass et al. | 382/284 |
| 5,613,032 A | * | 3/1997 | Cruz et al. | 386/69 |
| 5,703,961 A | * | 12/1997 | Rogina et al. | 382/154 |

FOREIGN PATENT DOCUMENTS

EP 0 618 471 A2 * 5/1994

OTHER PUBLICATIONS

Sawhney, Harpreet S., Model–based 2D&3D Dominant Motion Estimation for Mosaicing and Video Representation, Jun. 23, 1995, p. 583–590.*

(List continued on next page.)

Primary Examiner—Gabriel Garcia
(74) Attorney, Agent, or Firm—W. J. Burke

(57) ABSTRACT

An image processing system for imaging a scene to mosaic, selecting a new viewpoint of the scene, and rendering a synthetic image from the mosaic of the scene from that new viewpoint. The synthesized image is then combined with a second image. The combination of the second image and the synthetic image generates a composite image containing a realistic combination of objects in the second image and the scene. Using this system, a production set or other scene need only be created once, then imaged by the system. Thereafter, through image processing, any view of the scene can be synthesized and combined with separately imaged performers or other objects to generate the composite image. As such, a production set or other scene can be repetitively reused without recreating the physical scene.

25 Claims, 6 Drawing Sheets

OTHER PUBLICATIONS

Satoh, Kiyohide, "Passive Depth Acquisition for 3D Image Displays", Sep., 1994, p. 949–957.*

Seitz, Steven M., "Complete Scene Structure from Four Point Correspondences", Jun. 23, 1995, p. 330–337.*

Hsu. "View Interpolation Using Epipolar Plane Images." Proceedings ICIP–94, vol. 2, pp 745–749, Nov. 1994.*

Szeliski. "Image Mosaicing for Tele–Reality Applications." Proceedings $2^{nd}$ IEEE Workshop on Applications of Computer Vision, pp. 44–53, Dec. 1994.*

Seitz et al. "Physically–Valid View Synthesis by Image Interpolation." Proc. IEEE Workshop on Representation of Visual Scenes, pp. 18–25, Jun. 24, 1995.*

IBC 94, International Broadcasting Convention, Sep. 16, 1994, K. Haseba et al., "Real–Time Compositing System of a Real Camera Image and a Computer Graphic Image", pp. 656–660.

Proceedings of the Second IEEE Workshop on Applications of Computer Vision, Dec. 5, 1994, R. Szeliski, "Image Mosaicing for Tele–Reality Applications", pp. 44–53.

Proceedings of the 1994 IEEE Workshop on Motion of Non–Rigid and Articulated Objects, Nov. 11, 1994, H.S. Sawhney, "Simplifying Multiple Motion and Structure Analysis Using Planar Parallax and Image Warping", pp. 104–109.

Proceedings of the Third International Conference on Computer Vision, Dec. 4, 1990, R. Kumar et al, "Sensitivity of the Pose Refinement Problem to Accurate Estimation of Camera Parameters", pp. 365–369.

Proceedings of the IEEE Workshop on Visual Motion, Oct. 7, 1991, K.J. Hanna, "Direct Multi–Resolution Estimation of Ego–Motion and Structure from Motion", pp. 156–162.

Proceedings of the Fourth International Conference on Computer Vision, May 11, 1993, R. Cipolla et al., Robust Structure from Motion Using Motion Parallax, pp. 374–382.

CVGIP: Image Understanding, vol. 60, No. 3, Nov. 1994, Kumar et al., "Robust Methods for Estimating Pose and a Sensitivit Analysis", pp. 313–342.

International Search Report PCT/US96/11221, Sep. 9, 1996.

Fukui et al., "A Virtual Studio System for TV Program Production", SMPTE Journal, Jun. 1994, pp. 386–390.

Graf et al., "Perspective Terrain Visualization—A Fusion of Remote Sensing, GIS and Computer Graphics", Computers & Graphics, vol. 18, No. 6, 1994, pp. 795–802.

Park et al., "Image Synthesis Based on Estimation of Camera Parameters from Image Sequence", IEICE Transactions on Information and Systems, vol. E77–D, No. 9, Sep. 1994, pp. 973–986.

Supplementary European Search Report for EPO Appl. No. 96 923611 mailed Jun. 5, 2000 (counterpart to subject US application).

* cited by examiner

METHOD AND SYSTEM FOR RENDERING AND COMBINING IMAGES TO FORM A SYNTHESIZED VIEW OF A SCENE CONTAINING IMAGE INFORMATION FROM A SECOND IMAGE

CROSS REFERENCE TO RELATED APPLICATION

This application is a continuation of patent application Ser. No. 08/499,934, now abandoned entitled METHOD AND SYSTEM FOR RENDERING AND COMBINING IMAGES, filed on Jul. 10, 1995.

The invention relates to image processing systems and, more particularly, to an image processing system and a concomitant method that derives a synthetic image of a scene from a mosaic of images and combines the synthetic image with a separately generated second image to form a realistic composite image having objects of the second image appear in the synthetic image.

BACKGROUND OF THE DISCLOSURE

To produce a film or television program, the entertainment industry spends as much as fifty percent of a production budget on the creation of "sets" including repetitive set-up and tear-down of the sets. For the production of a typical television program, an inordinate amount of time and effort is expended to repetitively set-up and tear-down the sets. The extensive amount of time required to create and use production sets limits the availability of such sets and, consequently, limits the creativity and flexibility of script writers and producers. Furthermore, utilization of complex and/or large sets further increases the production cost of the program.

To decrease the costs associated with set utilization, attempts have been made at synthetically generating objects and scenes using computer graphics. However, these graphical techniques generally produce images that lack detail because, as detail is added to a computer generated image, the processing time and cost escalates dramatically. As such, computer generated graphics are presently relegated to crude depiction of three-dimensional objects and scenes. Furthermore, the lack of image detail causes the images to have unrealistic or synthetic appearance.

Heretofore, there has not been an image processing system capable of recording a production set and rendering various viewpoints of the set that enable the set to be physically created once and then electronically reused. Moreover, there has been not been a system capable of recording a scene, rendering any view of the scene as a synthetic image, then combining the synthetic image with a second image such that a composite image is formed that realistically contains objects of the second image in the synthetic image.

Therefore, a need exists in the art for a system that eliminates the need for repetitively creating, setting up, and tearing down production sets by electronically imaging and storing the production set for subsequent, repetitive use. Furthermore, a need exists for a system that images a scene such as a production set, electronically stores the scene, permits the imaged scene to subsequently be realistically viewed from any viewpoint, including a moving viewpoint, and permits a synthesized image representing the new viewpoint to be combined with other images.

SUMMARY OF THE INVENTION

The present invention is a system for imaging a three-dimensional scene (e.g., a production set) to generate a plurality of images thereof and image processing the plurality of images. The image processing includes retrieving the plurality of images from memory or directly from an image source, combining the images into a mosaic, selecting a new viewpoint of the scene, and rendering a synthetic image of the scene from that new viewpoint. The synthetic image is then combined with a second image. The combination of the second image and the synthetic image generates a composite image containing a realistic combination of the two images.

Furthermore, as the second image is being produced, the system monitors the pose of the camera, i.e., the camera's rotation, translation and zoom, to produce indicium of viewpoint of the camera. The system uses this pose information to update the view of the scene such that the view of the scene shown in the synthetic image tracks, in real-time, the camera pose used to generate the second image. As such, when the second image is combined with the synthetic image, the composite image realistically depicts objects of the second image in the scene. For example, if the scene is a production set and the second image is a performance by one or more performers, the composite image is the performance within the production set. Using the system, as the camera pose changes due to camera motion while the performance is imaged, the view of the production set is rendered to match the motion of the second image camera. Thus, to the viewer of the composite image, the performance realistically appears to be occurring on the production set.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is an image processing system and a concomitant method for recording a three-dimensional scene such as a production set and subsequently reproducing views of that scene from any viewpoint. The system then combines the reproduced view (a synthetic image) with a second image of, for example, "real" performers that are imaged separately from the scene to form a composite image. The system combines the second image with the synthetic image of the scene from a viewpoint of the camera used to create the second image. As such, the "synthetic" view of the scene tracks the motion of the camera used to create the second image. Thus, the composite image realistically depicts objects in the second image within the scene environment, e.g., performers acting within a production set.

Generally, the image of the scene and the second image are video images, i.e. sequences of image frames each containing an array of pixels. As such, the composite image is a sequence of images forming video. In its broadest sense, this invention can be used to process and combine any digital representation of images including individual images such as still photographs, or moving pictures such as film images and video, or animation art, or any combination thereof.

Figure 1:
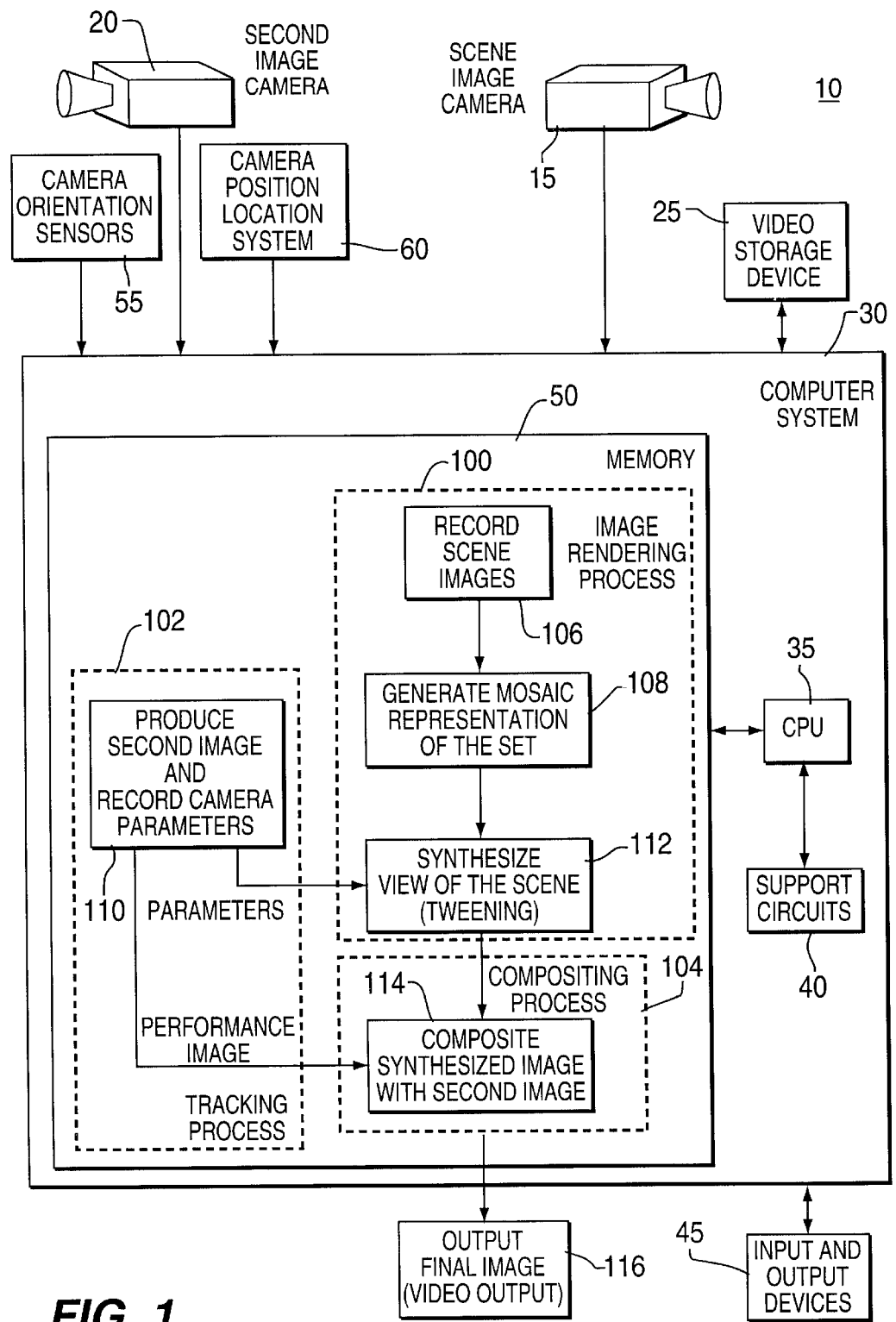
FIG. 1 depicts a high level block diagram of an image processing system in accordance with the present invention.

FIG. 1 depicts a high level block diagram of the an image processing system 10 in accordance with the invention. Specifically, FIG. 1 depicts a combination of hardware implementing the system and process steps executed by the system hardware to attain system functionality.

The system 10 comprises a computer system 30, a scene image camera 15, a second image camera 20, at least one camera parameter sensor such as a camera orientation sensor 55 and/or a camera position location system 60, a video storage device 25, and one or more input and output devices for the computer system. The computer system may be a general purpose computer system having a central processing unit (CPU) 35 that is programmed by executing one or more programs residing in memory 50 (e.g., random access memory, floppy disk, hard disk and the like). The CPU functions in conjunction with well-known support circuits 40 such as read only memory, power supplies, co-processors, and the like. The computer system is controlled by conventional input devices and displays information via conventional output devices. The video storage device is an optional system component that is used depending upon whether the CPU can process video signals in real-time or whether the video from the scene image camera 15 and/or the second image camera need to be stored before processing. Also, the video storage device can be used to store the output images 116 generated by the system. The video storage device may use any type of video storage media including video tape, semiconductor memory, disk drive memory, floptical memory and the like.

The system executes three main processes; namely, an image rendering process 100 that records the three-dimensional scene in such a manner that the various images of the set are easily processed to form an image mosaic, a tracking process 102 that produces the second image and tracks the camera position of the camera 20 used to produce that image, and a compositing process 104 that combines the second image with a synthetic image derived from the image mosaic of the scene. Although, for simplicity, the three main processes are depicted as being executed by a single computer 30, it should be understood that the processes could be executed upon separate computer systems. As such, each of the three processes could be executed at different locations and at different times. Furthermore, the three main processes may be executed on a single computer, but executed at different times.

More specifically, the image rendering process records, at step 106, various views of the production set using a camera 15 operating using various camera parameters such as position, orientation and zoom. These images (typically video images) can be stored using the video storage device 25 or stored in computer memory. At step 108, the various image views of the set are combined into an image mosaic representation of the set. Preferably, the mosaic representation includes a two-dimensional rendering of the images as well as parallax information such that the mosaic contains sufficient information for subsequent reproduction of a realistic three-dimensional image, i.e., the mosaic is a so-called three-dimensional mosaic.

Although, as shall become clear from the following disclosure, the second image can be provided by many sources of imagery; illustratively, the system uses the tracking process 102 and camera 20 for producing the second image. As the second image is produced, at step 110, the system also records indicium of camera viewpoint. The indicium is typically at least one of the camera parameters such as position (x, y, z), orientation ($\theta$, $\phi$, $\phi$,) and zoom (M) that are measured using at least one camera orientation sensor 55 and/or a position location system 60. These parameters are subsequently used by the compositing process 104.

The compositing process 104 combines the second image with a synthesized image of the scene. Specifically, the camera parameters are used to determine a viewpoint from which the scene should be viewed to produce the synthetic image. The system combines, at step 112, the mosaic representation with the camera parameters to derive (or synthesize) a synthetic image of the scene viewed from the camera position used to record the second image. The system then combines, at step 114, this synthesized image with the second image produced in step 110. The final image is displayed, at step 116, where this image (typically, a video sequence of images) contains the object of the second image within the scene. Importantly, as the second image camera view changes, e.g., camera pan and tilt, the synthetic image of the scene varies to match the camera motion. Consequently, the object of the second image appears as if it were imaged contemporaneously with the three-dimensional scene. As such, if the scene is a production set and the second image contains performers, the composite image contains the performers acting upon the production set.

Each of the processes that comprise the image processing system is individually discussed in detail below.

A. Image Rendering Process 100

Figure 2:
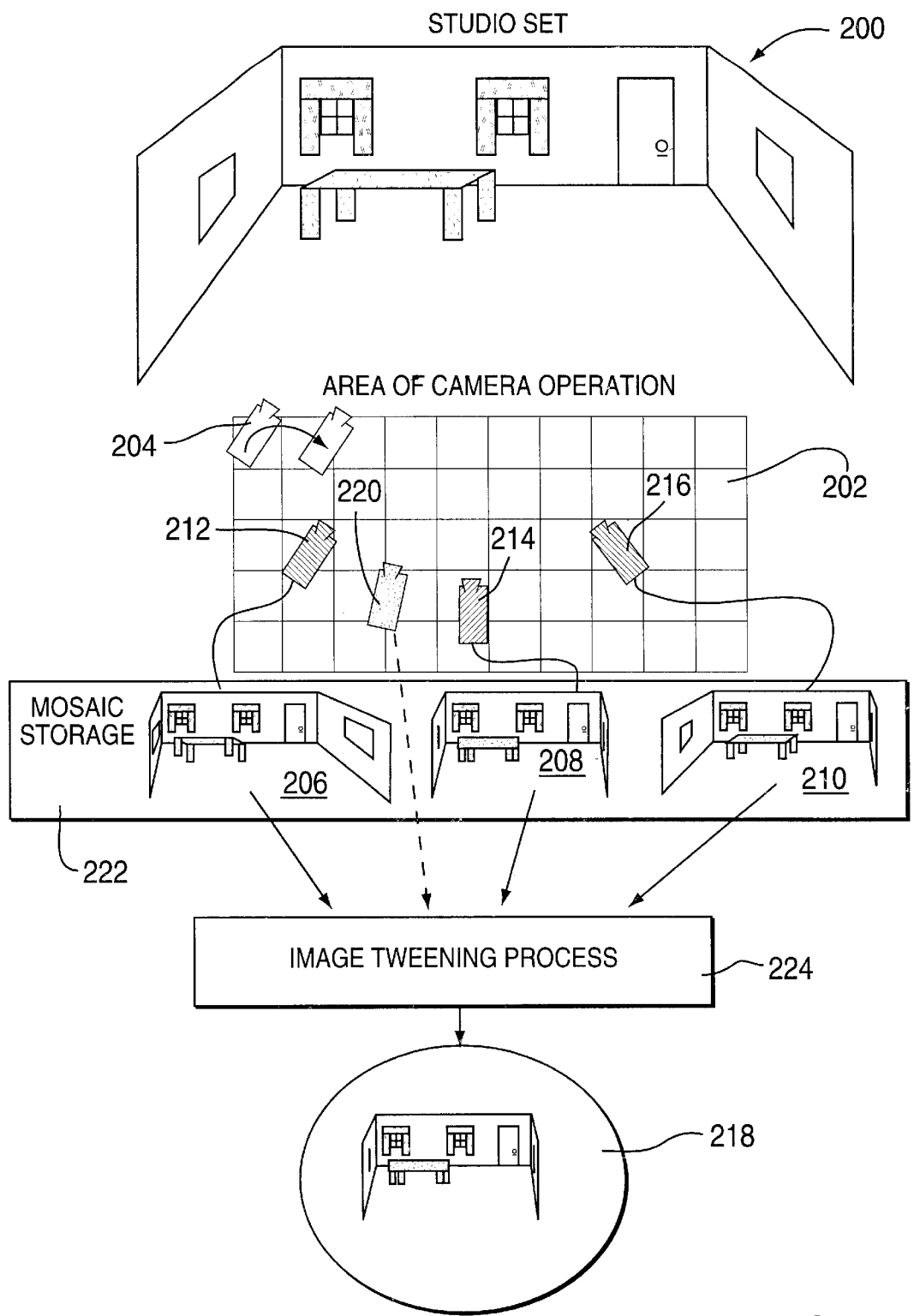
FIG. 2 depicts a schematic diagram of a hardware arrangement useful in imaging a production set in accordance with the present invention.

FIG. 2 depicts a hardware arrangement of camera(s) within a three-dimensional scene, illustratively studio or production set 200, that is used by the image rendering process to generate a mosaic representation of the scene. The mosaic is generated by a mosaic generation system (not shown) such as the two-dimensional mosaic system disclosed in commonly assigned U.S. patent application Ser. No. 08/339,491 entitled "Mosaic Based Image Processing System" filed Nov. 14, 1994 and incorporated herein by reference, or the three-dimensional mosaic system disclosed in commonly assigned U.S. patent application Ser. No. 08/493,632, entitled "Method And System For Image Combination Using A Parallax-Based Approach" filed Jun. 22, 1995 and incorporated herein by reference. Each of these mosaic generation systems would sufficiently function to render a useful mosaic. However, for best results, the three-dimensional mosaic generation technique is preferred.

As described in the docket 11789 application, given an existing 3D mosaic representing a three-dimensional scene and the pose (rotation, translation and zoom) of a new viewpoint with respect to that mosaic, the system can derive a synthetic image of the scene. As such, by capturing a scene using different cameras having different viewpoints of the scene, the system can synthesize images that are a view of the scene from viewpoints other than those of the cameras. Of course, a single camera can be used to image the scene from different locations and the mosaic generated from those images.

FIG. 2 depicts a hardware arrangement of camera(s) within a three-dimensional studio 200 (or production set) used to generate a 3D mosaic representation of the studio and derive a synthetic image of the scene from the mosaic. The studio is merely illustrative of one type of three-dimensional scene that can be recorded by the system. It, of course, can be replaced with any three-dimensional scene including film footage of historical events, sporting events and the like. The 3D mosaic generation process uses a plurality of images of the scene to produce one or more mosaics representing the scene. Although the mosaic(s) can be generated from any series of overlapping images, to avoid holes in the mosaic and other anomalies in the mosaic(s), it is best to deliberately image the scene using a two-dimensional grid for camera positioning. As such, a two dimensional grid 202, defining a plurality of one foot by one foot squares, is used to define camera positions within an area proximate to the set. In general, the specific size of the grid squares, i.e., the number of camera positions, will vary depending upon the complexity of the scene. Also, the shape of the grid will vary depending upon the type of scene being recorded, e.g., some scenes, such as a sporting event, may be circumscribed by the grid.

To produce the images for the mosaic(s), a camera 204 records an image (or a series of images, e.g., video) from each of the grid squares. The images are typically recorded at various camera pan, tilt, rotate and zoom positions for each grid square to generate the plurality of images from a plurality of viewpoints. The image rendering process generates a 3D mosaic from the various images recorded at each camera location. Similarly, 3D mosaics are generated for the other camera locations at each of the grid points. For example, 3D mosaics 206, 208, 210 (only the image mosaic portion is depicted) represent the scene as recorded from grid locations 212, 214, and 216. These 3D mosaics are merged to generate a synthetic image 218 representing the scene as viewed from, for example, location 220. The image generated at the synthetic viewpoint is not a "real" camera viewpoint, but rather is synthesized from information contained in the various mosaics.

To generate a mosaic to accurately represent the three-dimensional scene, the rendering process registers the images recorded at each camera location. The registration process typically uses a hierarchical direct registration technique to determine translation parameters that can be used to warp the images into alignment. Once aligned, the images can be merged (or fused) with one another to form a mosaic of the scene. United States patent application Ser. No. 08/339,491, filed Nov. 14, 1994, discloses an illustrative technique for producing mosaics using hierarchical direct registration. Furthermore, once the mosaic is generated, additional imagery can be added to the mosaic using conventional image merging and fusing techniques.

Figure 3:
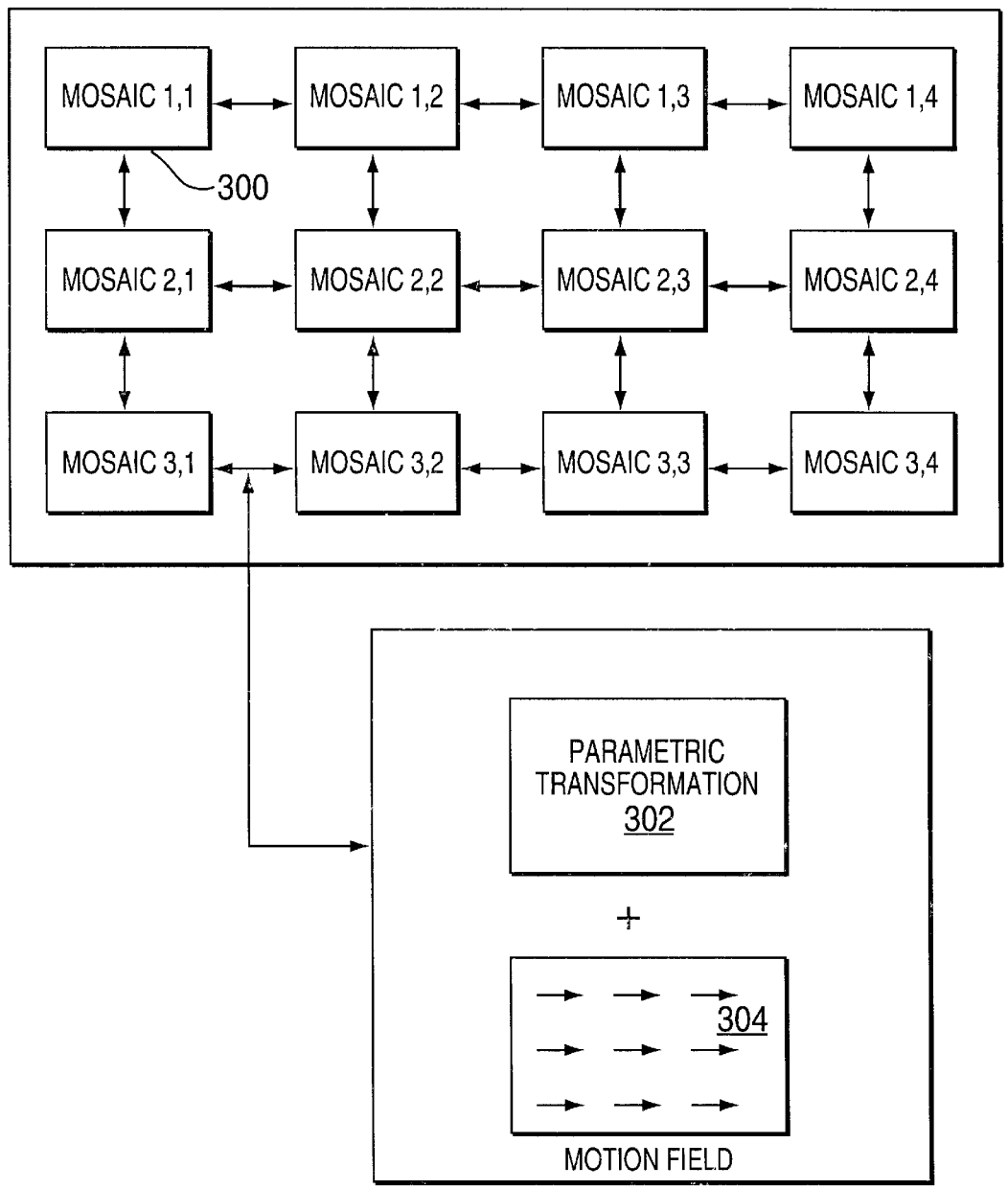
FIG. 3 depicts a mosaic-based representation of an image.

More specifically, as shown in FIG. 3, the various images recorded at each camera location are combined into a plurality of mosaics, i.e., one mosaic 300 for each grid point. To produce each of the mosaics, the camera is panned, tilted, rolled and zoomed at each grid point. As such, for each grid point, the system generates a mosaic containing image information with respect to four camera parameters. Since each mosaic is related to a specific three-dimensional location, the mosaics form an addressable three-dimensional array. Each mosaic is related to its neighboring mosaics by a parametric transformation 302 and a motion flow field 304. Since the production set being imaged is typically static, the motion flow field represents parallax motion of objects within the image, i.e., the three-dimensional geometry of the scene. This parallax motion is also referred to as the "shape" of the scene. In other words, as the camera moves from location to location, parallax causes objects in the scene to move relative to the background, e.g., as a camera pans, a foreground chair seems to move with reference to a background wall. By storing the mosaics as well as a parametric transformation relating one mosaic to the next, e.g., the motion of the background as the camera physically moves, and the motion flow field information, e.g., the parallax information representing the three-dimensional geometry of the scene, the entire scene can be recreated from any viewpoint and none of the three-dimensional geometry is lost. Thus, a given three-dimensional mosaic comprises an image mosaic representing a panoramic view of the scene and a shape mosaic representing the three-dimensional geometry of the scene.

The process used to generate a synthetic image view of the scene is known as "image tweening". This process warps each of the individual mosaics (e.g., mosaics 206, 208, and 210) to the location of the synthetic viewpoint (e.g., location 220). Thus, as each 3D mosaic is generated for each grid point, the 3D mosaic is stored in memory (mosaic storage 222) with respective to its associated grid point. Given a new viewpoint location, the mosaics are recalled from memory to generate a synthetic image representing the scene from the new viewpoint. Depending upon the complexity of the scene being imaged, the system may recall each of the 3D mosaics in memory or some subset of those mosaics, e.g., only recall those mosaics that are nearest the new view location. Using image tweening process 224, each recalled 3D mosaic is warped to the new viewpoint location (e.g., location 220) and the mosaics are merged to form the new view image 218. Image merging (also known as image fusing) is typically accomplished by averaging the pixels of the various mosaics used to form the synthetic image. However, other forms of image merging are known in the art and can be applied to these 3D mosaics. For an example of an image fusing technique, see commonly assigned U.S. Pat. No. 5,325,449 and U.S. patent application Ser. No. 08/059,616 and herein incorporated by reference. The result generated by the image tweening process is a synthetic image (e.g., image 218) representing a new viewpoint of the scene 200. The synthetic image is generated in real-time such that, as will be discussed below, the synthetic image can be combined with a real-time production of the second image.

This rendering process can, of course, be replaced with or augmented by a computer aided design (CAD) process that generates graphic images of a production set. It is foreseeable that, as computer processing power becomes less expensive, that CAD processes will be able to generate realistic images of production sets at a reasonable cost. Typically, a graphically generated image comprises a plurality of interconnected polygons that are "painted" with a texture that simulates a "real" image. Textures contain various pre-computed or captured, pixel patterns that can be mapped onto the surfaces represented by the polygons. Improved computing enables the polygons and their associated textures to attain realism.

Such a graphically generated scene may comprise a plurality of mosaics representing different views of the scene. An extensive amount of time may be expended to generate realistic graphical images of the scene. These mosaics are rendered, as described above, to enable any viewpoint of the scene to be synthesized in real-time. As such, a graphically generated scene may be used in the same manner as the mosaic(s) discussed above to produce synthesized images from synthesized viewpoints. Consequently, time and expense can be expended generating the graphically generated scene mosaics, but once they are generated, the system of the invention can render new views of the scene in real-time.

B. Camera Tracking Process

Figure 4:
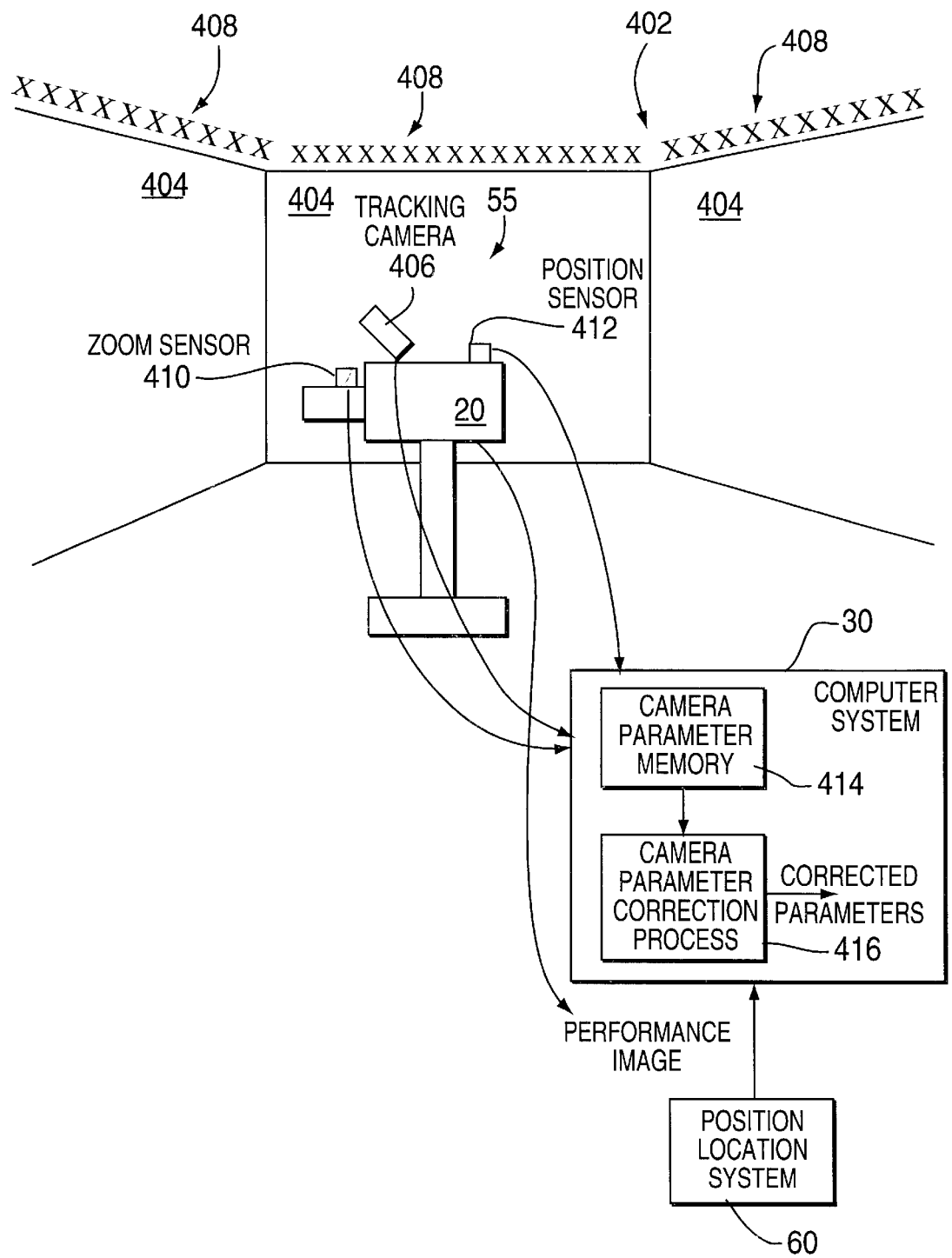
FIG. 4 depicts hardware used to implement a camera tracking process in accordance with the present invention.

The camera tracking process uses a combination of hardware and software to track and record a variety of indicium of viewpoint for the camera while the camera is used to generate the second image. FIG. 4 depicts a sound stage 402 including a camera 20 for imaging a performance of one or more performers (not shown) and/or some other object of the second image and a computer system 30 for storing and correcting the indicium of viewpoint. The indicium of viewpoint is, for this illustrative example, at least one camera parameter and, typically, is a set of camera parameters that are corrected by the computer system. Using a set of corrected camera parameters, the second image is subsequently combined with the synthetic image to produce the composite image.

Typically, to facilitate the use of chroma-key techniques during the image compositing process, the object of the second image is positioned before a blue (or sometimes green) screen. In the illustrated room 402, the walls 404 are painted blue. To aid in camera position tracking, the walls contain a series of indicia 408 positioned about the top of the room 402, e.g., blue X's on a blue wall that lie outside the scene being imaged. Of course, the indicia may be located on the floor or any other location in the studio. These indicia may be identical to one another or unique. Furthermore, by using blue indicia on the blue walls, the indicia are easily extracted from the second image leaving only the object of the second image for combining with the synthetic image.

Preferably, these indicia 408 are continuously imaged by one or more "tracking" cameras 406 (one of which is shown) located atop the second image camera 20. Alternatively, as discussed in detail below, the indicia may be directly imaged by the second image camera as it produces the second image. In either case, once processed and combined with the synthetic image, the indicia form no part of the second image because the indicia, if they appear at all, are designed to be extracted from the second image by the image compositing process.

In addition to the tracking camera, the second image camera is outfitted with a zoom sensor 410 and a variety of camera orientation sensors 412. A high speed computer system 30 stores the output video from the tracking camera as well as the camera parameters. The tracking camera video signal may alternatively be stored separately in a video signal recording medium such a video tape. Likewise, the video signal (hereinafter referred to as the performance image or second image) from the second image camera is sent directly to the compositing process for real-time combination with the synthetic image or, alternatively, the video signal may be recorded onto a recording medium such as a video tape.

Camera position determination is accomplished using two steps;

namely, in step 1, the system directly measures camera parameters to crudely estimate the camera position, and, in step 2, the system uses the indicia images by the tracking camera (hereinafter referred to as the reference image) to refine (correct) the camera parameters of step 1. As the camera moves while producing the second image, the computer 30 records, in parameter memory 414, seven camera parameters, e.g., position (x,y,z), roll ($\theta$), pan ($\phi$) tilt ($\phi$) and zoom (M). To generate the position parameters, a position location system 60 measures the x,y,z position relative to an origin that is arbitrarily chosen to be, for example, the corner of the room. To generate the other camera parameters, the system uses commercially available sensor systems for monitoring camera pan, tilt, roll, and zoom, e.g., the Memory Head manufactured by Ultimatte Corporation of Chatsworth, Calif.

The camera position parameters (x,y,z) can be attained using a position a location system based upon ultrasonic, infrared, or spread spectrum technology. For example, a typical commercially available ultrasonic range finder has an accuracy of 1.5 percent. In a typical studio, using three ultrasonic range finders to determine a three-dimensional position, such an accuracy would result in a camera position error of less than 3 inches. Such accuracy in the camera parameters are sufficient to estimate the camera position, but further information may be necessary from the tracking camera to refine the position estimate to an accuracy that is sufficient to generate a realistic image by to combining the performance image with a synthetic image. The parameter correction is accomplished in process 416. The corrected camera parameters are used by the composition process to combine the second image and the synthetic image.

In some studios the camera location or, if more than one camera is used, the camera locations, are fixed. In these arrangement, the camera positions relative to the position origin are fixed and need only be determined once. Thereafter, the camera motion is solely measured by the commercially available pan, tilt, roll, and zoom sensors. These sensors are sufficiently accurate to determine the camera parameters without further refinement or correction of the directly measured parameters. Thus, a tracking camera and studio indicia would not be necessary.

Figure 5:
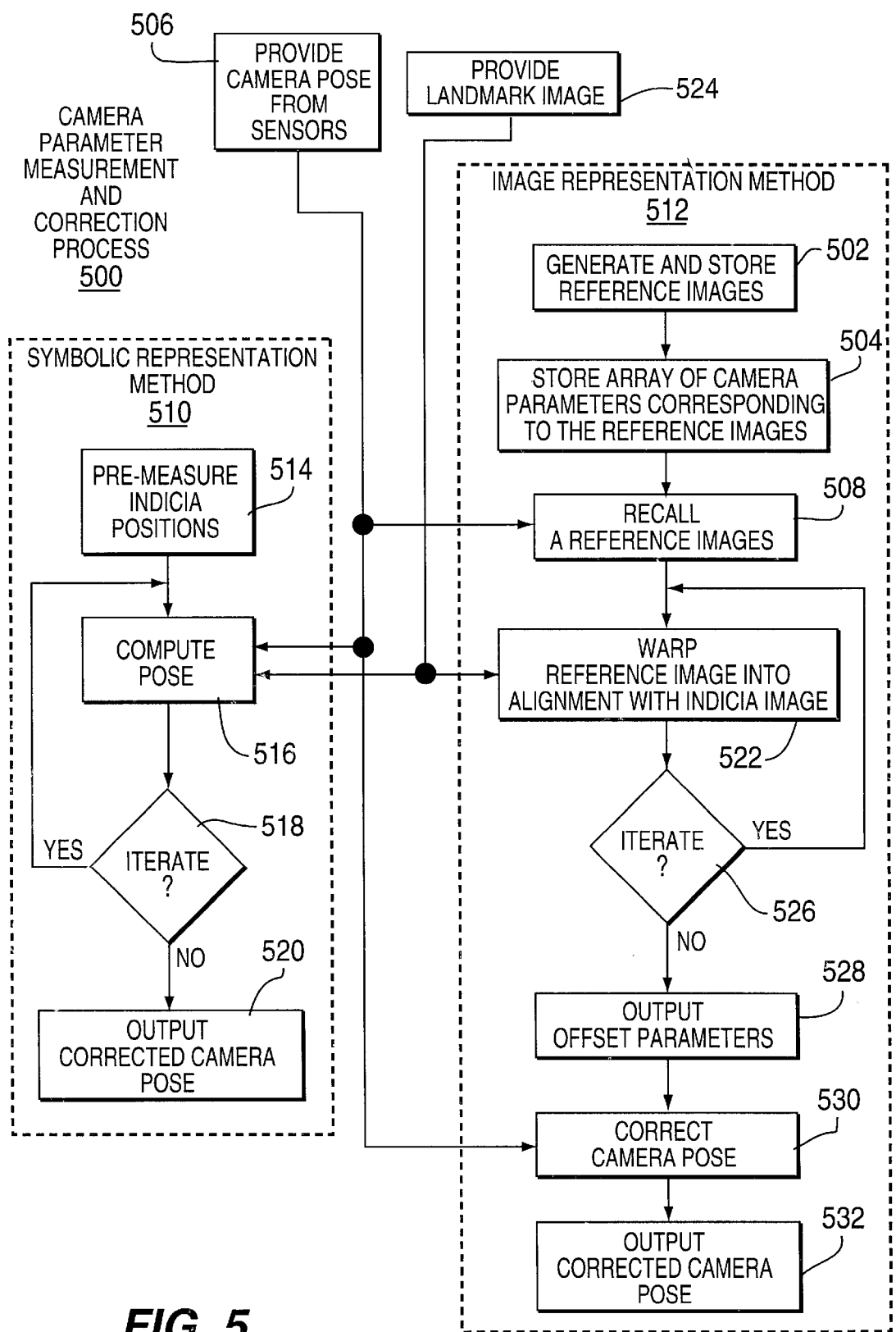
FIG. 5 depicts a flow chart of the camera parameter measurement and tracking process.

FIG. 5 depicts a detailed flow chart of the camera parameter measurement and correction process 500 that produces the indicium of camera viewpoint. This process contains two examples of many possible techniques available to produce the indicium of camera viewpoint. The invention may contain any of these techniques including merely accurately measuring the position and orientation of the camera without further refinement.

The system of the present invention illustratively uses one of two methods of refining the camera parameters. The camera parameters, when taken together, define the camera pose. The first method 510 uses a symbolic representation of the studio, while the second method 512 uses an image representation of the studio.

For the symbolic representation of the studio, the position of each landmark is premeasured, at step 514, in absolute terms with reference to a fixed coordinate system, e.g., having the origin of the coordinate system at the corner of the studio. Using the tracking camera image(s) provided in step 524, the method determines the pose of the camera, i.e., the rotation, translation and zoom parameters of the camera relative to the reference coordinate system. The camera pose is computed at step 516 by first estimating the pose using the measured camera parameters, then refining (correcting) the estimate using a pose estimation process. Camera pose determination and estimation using indicia of scene orientation is a well-known technique. See, for example, Kumar et al., "Robust Methods for Estimating Pose and a Sensitivity Analysis", CVGIP: Image Understanding, Vol. 60, No. 3, November, pp. 313–342 (1994). Using this technique and given the correspondence between indicia in an image, the technique determines rotation and translation matrices that map a reference or "world" coordinate system to a "camera coordinate system. The technique described in this paper is applied to the indicia on the studio walls such that the camera pose first estimated by the sensors is refined to compute accurate camera parameters. The system iterates the camera pose through the levels of the image pyramid representation of the reference image until a sufficient degree of accuracy is achieved. At step 520, the system outputs the corrected camera pose.

For the image representation of the studio, at step 502, the entire studio is imaged from various, known locations within the room (e.g., using a grid pattern) and the video signal from the tracking camera is stored as a series reference images. At step 504, these reference images of the indicia are stored with reference to an array of camera positions as measured by the camera position location system and orientation sensors. The array maps the camera positions, as measured at each grid location with the grid pattern, to a specific view of the indicia in each reference image. In this manner, given, at step 506, a camera pose (e.g., a set of camera parameters representing the camera's rotation, translation and zoom with respect to a known reference coordinate system), the system recalls, at step 508, a particular view of the indicia, i.e., the system recalls a particular reference image. Typically, to permit rapid computations using the images, each reference image is stored as an image pyramid. Image pyramids are well-known in the art for their use in representing a single image as a series of levels where each level has a lesser resolution than a previous level. Generally, image pyramids are formed by Laplacian or Guassian filtering pixels in each level of a pyramid to form a level having a lesser resolution. Two examples of image pyramid use in the image processing art are disclosed.by Anderson et al. in U.S. Pat. No. 4,692,806 and van der Wal in U.S. Pat. No. 4,703,514. Using the image representation, the reference images themselves are used to compute offset parameters that estimate the relative alignment between the measured camera parameters and the reference alignment information.

Since the camera parameters are associated with each reference image, those camera parameters are the pose of the camera for generating each reference image. The present camera parameters are used to select from memory a reference image that represents an image taken from the nearest grid position to the present camera position identified by the measured camera parameters. Thereafter, the system warps, at step 522, the reference image into alignment with an image of the indicia (hereinafter referred to as the landmark image) associated with the performance image provided at step 524. To provide for an iterative process, the landmark image is typically filtered to form an image pyramid. The image warping is interatively accomplish, through step 526, over the image pyramids of the reference image and the landmark image until the reference image is accurately aligned with the landmark image. The translation necessary to align the reference and landmark images produces a set of offset parameters at step 528 which indicate the inaccuracy of the camera parameters as reported by the various sensors and, especially, by the position location system. These offset parameters are then used, at step 530, to correct the measured camera parameters to attain a substantially accurate position of the camera relative to the room origin. The corrected parameters, output at step 532, are indicative of the actual position of the camera relative to a reference coordinate system. Such an image alignment approach is disclosed by K. J. Hanna, "Direct Multi-Resolution Estimation of Ego-Motion and Structure From Motion", Proceedings of the IEEE Workshop on Visual Motion, Princeton, N.J., Oct. 7–9, 1991, pp. 156–4162 and by Hanna in commonly assigned U.S. Pat. No. 59,0402 incorporated herein by reference. Additionally, commonly assigned U.S. patent application Ser. No. 08/493,632, entitled "Method And System For Image Combination Using A Parallax-Based Approach" filed Jun. 22, 1995 and incorporated herein by reference also discloses an image alignment approach.

Alternatively, the system tracks the camera position by imaging the indicia with the second image camera, i.e., without using the tracking camera. As such, the indicia image is, in essence, embedded into the second image and the reference images are prerecorded using the second image camera. In this alternative approach, the field of view of the second image camera is broad enough to image the indicia as well as the object of the second image. The process used to compute the offset parameters remains the same as described above, e.g., the reference image is warped into alignment with the landmark image (now a portion of the second image) and computing the offset parameters based on the degree of image warping used to align the reference and indicia images. Subsequently, during image composition, the indicia can be masked from the final image. Various techniques for camera orientation indicia tracking and utilization are discussed in commonly assigned U.S. patent applications Ser. No. 08/222,207, filed Mar. 31, 1994; Ser. No. 08/380,484, filed Jan. 30, 1995; and Ser. No. 08/456, 020, filed May 31, 1995. The disclosures of each of these patent applications are herein incorporated by reference.

Additionally, some of the parameters do not have to be as accurately determined as other parameters. As such, the computation of the absolute camera position can be simplified. The simplification involves smoothing some of the camera parameters such as zoom, pan, tilt, and roll, while other parameters such as position parameters (x,y,z) are corrected using one of the landmark imaging techniques described above. In this manner, the indicia imaging techniques need only be applied to three variables and the four other variables are mathematically computed using averaging or interpolation of the measured parameters.

C. Image Composition Process

The foregoing sections discussed generating a three-dimensional mosaic of a scene (e.g., a production set, background image and the like) and also generating a second image as well as indicium of viewpoint associated with the second image. Although the foregoing discussion has focused upon generating the second image using the tracking process, the second image can be generated by any number of sources including computer graphics, animation art, a second synthesized image rendered from a second 3D mosaic, historical films, photographs, and the like. This section describes the process by which the inventive system combines the second image with a synthesized image extracted from the three-dimensional mosaic of the scene. The result is a realistic composite image depicting the object of the second image within the scene.

Figure 6:
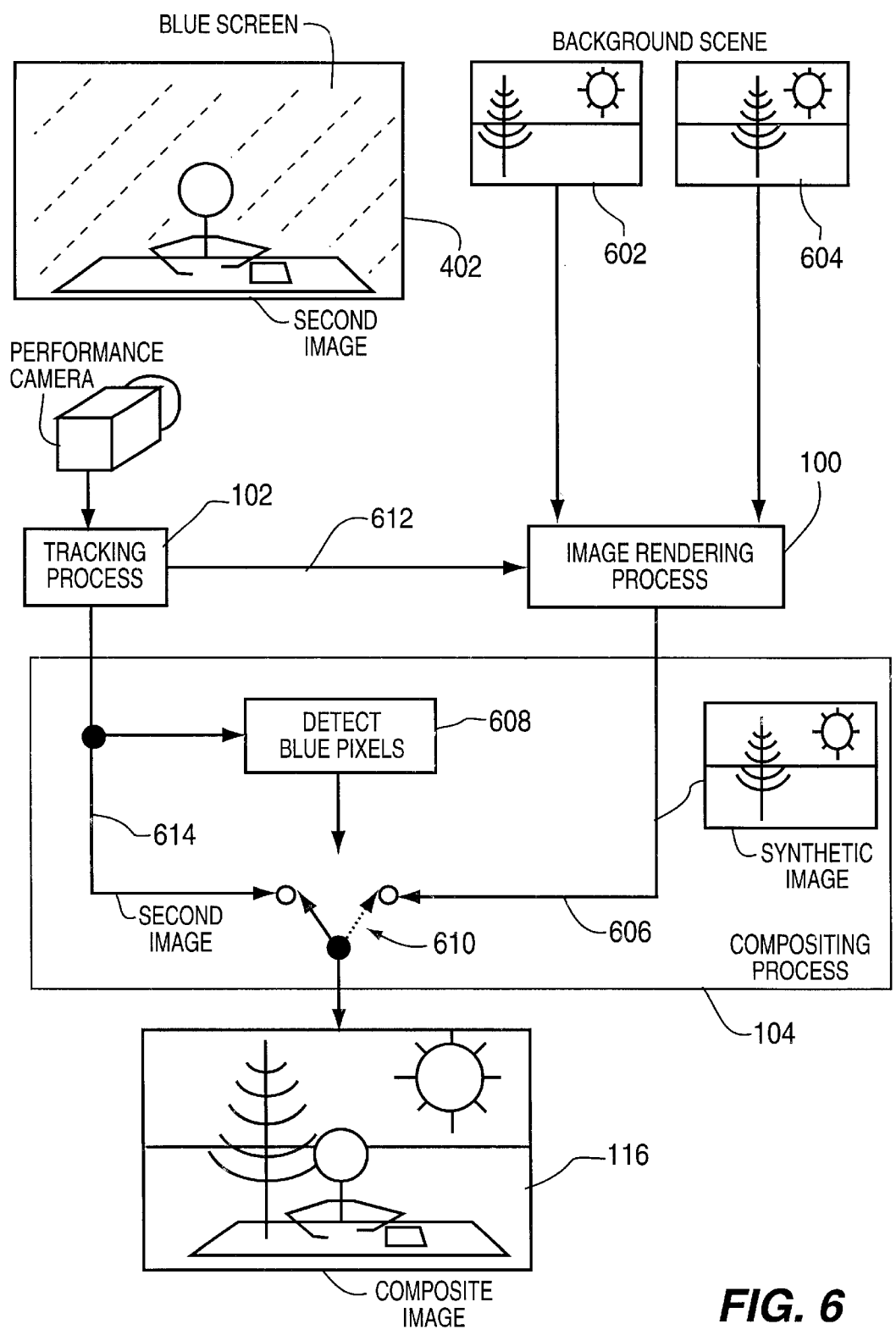
FIG. 6 depicts a block diagram of an image composition process.

FIG. 6 depicts a block diagram of the image compositing process 104. As described above, the image rendering process 100 provides a synthetic image, on path 606, from a plurality of images 602 and 604 of a scene. The tweening process generates the synthesized image using the corrected camera parameters produced, on path 612, during the camera tracking process 102. The seven corrected camera parameters form an input to the tweening process within image rendering process 100. From these seven parameters, the tweening process generates, from the image mosaic, a synthetic image that represents a view of the scene (e.g., a production set, background scene, and the like) as it would be viewed from the position of the second image camera.

Using a conventional chroma-key image composition technique, the second image, on path 614, is combined with the synthesized image, on path 606. Generally speaking, the chroma-key technique monitors, using blue pixel detector 608, the second image(s) for pixels having a blue color. Each detected blue pixel is replaced, on a pixel location by pixel location basis, with a pixel from the synthesized image. This replacement process is illustrated by switch 610. The composite or final image 116 is a seamless combination of the second image and the synthesized image. The system performs the composition process for each frame of video such that the output image is typically a video signal. Additionally, as the camera producing the second image moves relative to its reference system, new camera parameters are sent to the tweening process to produce updated synthesized images such that the scene changes wish camera position. As such, the system produces video images of the object of the second image within the scene. If the object of the second image is a performance and the scene is a production set, the set can be reused without costly set-up and tear-down. Such a system reduces, for just about any production, production cost and production time.

Alternative approaches to image combination are available that do not use the chroma-key technique. One such approach is disclosed in commonly assigned U.S. Pat. No. 5,488,674, entitled "Method For Fusing Images And Apparatus Therefor" and commonly assigned U.S. Pat. No. 5,325,449, both of which are herein incorporated by reference. The invention can use any image compositing technique that can mask or remove the background (or portion thereof) as well as the indicia from the second image and replace the removed or masked portion with an appropriate portion of the synthesized image.

At times, the synthesized image may contain lighting that is not commensurate with the lighting used while recording the performance. The system can accommodate this problem using various illumination matching processes.

Specifically, to accommodate various light levels when producing the composite image, three different light levels are used while generating the individual images for the mosaics. In effect, three mosaics are produced for each grid point, one mosaic for each light level. During image synthesis, the synthesized image is produced by interpolating pixel luminance of the three mosaics for each pixel in the synthesized image. The weighting used in the interpolation is user defined, such that a system operator can adjust the degree of inclusion or exclusion of one of the three mosaics to achieve a lighting level that matches the illumination in the performance image.

In addition to the foregoing illumination compensation process, the system may use a number of image filtering and enhancement techniques to adjust the luminance level of a specific portion(s) of the image. For example, objects in the synthesized image having surfaces that are perpendicular to the direction of the light used to illuminate the object of the second image can be enhanced to appear to also be illuminated. In this manner, a synthesized image of a scene seems as if it were recorded contemporaneously with the second image.

Specifically, when illumination is projected onto a scene, structure that lies perpendicular to the illumination typically has contrast. One approach to synthesize a new illumination direction is to decompose an image into structure at different orientations, modify the structure at each orientation, and recombine the image to produce an altered output image. For example, an image can be decomposed into several gradient orientation and scale bands using an oriented Laplacian pyramid. This pyramid has the property that summing all the bands unchanged results in the original image. To synthesize the effect of a different illumination angle upon the image, those orientation bands perpendicular to the desired synthetic illumination angle are amplified, and those orientation bands parallel to the desired illumination angle are attenuated. To illustrate, an oriented Laplacian pyramid can be computed from an input image resulting in a set of four filtered images at several scales. The cosine of the angle between the filter orientation that produced each filtered image and the desired synthetic illumination is then computed. The filtered image is then multiplied by this gain. This is accomplished for each orientation at each scale. The images are then recombined to produce an output image. An adjustment allows an operator to cycle through different illumination settings until the desired synthetic illumination is attained.

Additionally, the gains on the oriented filter outputs can be adaptively adjusted depending on the image structure, rather than a single gain for each filtered image. This allows for more accurate illumination synthesis since specific image features can be processed differently form other features. For example, hard shadow edges could be differentiated from hard physical edges, such as steerable filters, allowing for filtering at an arbitrary orientation using only a small set of basis filters. This can allow for more precise illumination synthesis since the image representation is richer.

The system of the present invention has many practical uses other than the illustrative application of imaging a production set for subsequent repetitive use. Other applications include video game production, where a "real" scene can be rendered such that sequential synthetic images are generated as the game progresses. The second image could be a computer generated animated character. The character, for example, would move about the scene as directed by a user manipulating an input device such as a joy stick connected to the system. For each user command, a new synthetic scene image is rendered from the scene mosaic. As such, the user would control the viewpoint indicia used in the rendering process and the animated character would follow that viewpoint. Furthermore, the character could be synthesized from a second mosaic such that the character is rendered from the second mosaic in accordance with the present viewpoint. Additionally, other characters, possibly representing other players of a computer game, could be added to the scene in a similar manner. Consequently, a virtual reality is produced representing various objects and characters within the scene that will alter position and appearance in accordance with each user's viewpoint.

Although various embodiments which incorporate the teachings of the present invention have been shown and described in detail herein, those skilled in the art can readily devise many other varied embodiments that still incorporate these teachings.

What is claimed is:

1. A method for image processing comprising the steps of:
generating a mosaic containing a plurality of first images of a scene and translation parameters for each of said first images, where said translation parameters define an alignment relationship for each of the first images with respect to common image information contained in each of the first images, said plurality of first images including at least an image having a first viewpoint of said scene and an image having a second viewpoint of said scene, said first and second viewpoints being non-coincidental;
generating a second image;
producing an indicium of viewpoint while generating said second image;
rendering, in response to said indicium of viewpoint, a synthesized image of said scene from said mosaic, said synthesized image comprising image information from said first and second viewpoints of said scene; and compositing said synthesized image with said second image to produce a composite image including parallax information.

2. The method of claim 1 wherein said mosaic is a plurality of mosaics.

3. The method of claim 1 wherein said step of generating said second image includes the step of rendering said second image from a second mosaic.

4. The method of claim 1 wherein said indicium of viewpoint is at least one camera parameter.

5. The method of claim 1 wherein said step of generating a second image further comprises the step of imaging a performance before a background having a color that can be removed from the second image using a chroma-key technique.

6. The method of claim 1 wherein said step of producing an indicium of viewpoint further comprises the step of recording at least one camera parameter selected from the following group of camera parameters: three-dimensional position, pan, tilt, roll and zoom parameters.

7. The method of claim 1 wherein said step of producing an indicium of viewpoint further comprising the steps of:
providing a plurality of indicia proximate an area where a performance is imaged as said second image; and
imaging said plurality of indicia as a landmark image while generating said second image.

8. The method of claim 7 wherein said landmark imaging step further comprises the step of generating said second image using a camera.

9. The method of claim 7 further comprising a step of imaging a plurality of reference images representing said indicia viewed from a plurality of viewpoints.

10. The method of claim 9 further comprising a step of correcting said indicium of viewpoint using said plurality of reference images.

11. The method of claim 10 further comprising the steps of:
measuring an absolute location of the indicia; and
computing camera pose in response to the absolute location of the indicia and a measurement of camera pose represented by said indicium of viewpoint.

12. The method of claim 1 wherein said mosaic is a three-dimensional mosaic containing an image mosaic representing a panoramic view of the scene and a shape mosaic representing a three-dimensional geometry of the scene.

13. The method of claim 12 wherein said synthesized image is rendered from said three-dimensional mosaic.

14. The method of claim 13 wherein said mosaic generating step further comprises the steps of:
imaging a scene from a plurality of grid points;
generating a mosaic at each of said grid points; and
storing each of said mosaics with reference to a particular grid point.

15. The method of claim 14 wherein said step of generating a mosaic at each of said grid points further comprises:
generating a plurality of mosaics at each grid point, where each of said mosaics is generated at a different illumination level of the scene;
rendering said synthesized image by matching illumination levels of said synthesized image and said second image.

16. The method of claim 1 wherein the indicium of viewpoint is produced by a user controlled input device.

17. A method for image processing comprising the steps of:
generating a mosaic containing a plurality of first images of a scene, said plurality of first images including an image having a first viewpoint of said scene and an image having a second viewpoint of said scene;
generating a second image;
providing a plurality of indicia proximate an area where a performance is imaged as said second image;
imaging, using a tracking camera that is separate from a camera used to generate said second image, said plurality of indicia as a reference image while generating said second image
rendering, in response to said indicium of viewpoint; a synthesized image of said scene from said mosaic, said synthesized image comprising image information from said first and second viewpoints of said scene; and
compositing said synthesized image with said second image to produce a composite image.

18. A method for image processing comprising the steps of:
generating a mosaic containing a plurality of first images of a scene, said plurality of first images including an image having a first viewpoint of said scene and an image having a second viewpoint of said scene;
generating a second image;
providing a plurality of indicia proximate an area where a performance is imaged as said second image;
imaging said plurality of indicia as a reference image while generating said second image;
rendering, in response to said indicium of viewpoint, a synthesized image of said scene from said mosaic, said synthesized image comprising image information from said first and second viewpoints of said scene;
compositing said synthesized image with said second image to produce a composite image;
imaging a plurality of reference images representing said indicia viewed from a plurality of viewpoints;
correcting said indicium of viewpoint using said plurality of reference images;
selecting a reference image that represents a viewpoint that best represents a viewpoint indicated by said indicium of viewpoint;
warping said selected reference image into alignment with a landmark image generated from said viewpoint represented by said indicium of viewpoint;
computing, in response to said alignment, offset parameters for correcting said indicium of viewpoint; and
generating said synthesized image in response to said corrected indicium of viewpoint.

19. An image processing system comprising:
mosaic generation means for generating a mosaic of first images representing a scene and translation parameters for each of said first images, where said translation parameters define an alignment relationship for each of the first images with respect to common image information contained in each of the first images and having a first viewpoint;
viewpoint indicium means for generating an indicium of viewpoint, non-coincidental with said first viewpoint, for a second image;
rendering means, connected to said mosaic generation means and said viewpoint indicium means, for producing a synthetic image derived from said mosaic that represents a view of the scene corresponding to the indicium of viewpoint; and
compositing means, connected to said rendering means and said viewpoint indicium means, for combining said synthesized image and said second image to form a composite image including parallax information.

20. The system of claim 19 wherein said mosaic generation means further comprises:

means for generating a plurality of mosaics, where each mosaic in said plurality of mosaics represents a panoramic view of the scene from a unique location.

21. The system of claim 19 wherein said viewpoint indicium means further comprises:

means for tracking a camera pose as said camera produces said second image; and means, connected to said tracking means, for generating said camera pose as an indicium of viewpoint.

22. The system of claim 19 wherein said viewpoint indicium means further comprises:

means for producing said indicium of viewpoint in response to user commands.

23. The system of claim 19 wherein said compositing means further comprises:

means for combining said synthetic image and said second image using a chroma-key process.

24. The system of claim 21 wherein said camera pose includes indicium of viewpoint selected from the following group of camera parameters: three-dimensional position, pan, tilt, roll and zoom.

25. The system of claim 19 further comprising: second mosaic generation means for generating a second mosaic of images representing a second scene; and second rendering means, connected to said viewpoint indicium means and said second mosaic generation means, for producing said second image.

* * * * *